United States Patent
Khakpour et al.

(10) Patent No.: US 10,609,173 B2
(45) Date of Patent: Mar. 31, 2020

(54) PROBABILITY BASED CACHING AND EVICTION

(71) Applicant: Verizon Digital Media Services Inc., Dulles, VA (US)

(72) Inventors: Amir Reza Khakpour, Santa Monica, CA (US); Harkeerat Singh Bedi, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 16/385,537

(22) Filed: Apr. 16, 2019

(65) Prior Publication Data
US 2019/0312948 A1    Oct. 10, 2019

Related U.S. Application Data

(63) Continuation of application No. 14/293,368, filed on Jun. 2, 2014, now Pat. No. 10,270,876.

(51) Int. Cl.
*H04L 29/08* (2006.01)
*G06F 12/123* (2016.01)
*G06F 12/0888* (2016.01)

(52) U.S. Cl.
CPC ........ *H04L 67/2842* (2013.01); *G06F 12/123* (2013.01); *H04L 67/2852* (2013.01); *G06F 12/0888* (2013.01)

(58) Field of Classification Search
CPC ........ H04L 67/00–67/42; G06F 12/12–12/128
See application file for complete search history.

(56) References Cited

U.S. PATENT DOCUMENTS

| | | | |
|---|---|---|---|
| 6,038,601 | A | 3/2000 | Lambert et al. |
| 6,098,064 | A | 8/2000 | Pirolli et al. |
| 6,425,057 | B1 | 7/2002 | Cherkasova et al. |
| 7,076,611 | B2 | 7/2006 | Steere et al. |
| 7,085,843 | B2 | 8/2006 | Buddhikot et al. |
| 8,176,258 | B2 | 5/2012 | Wang |
| 8,914,582 | B1 | 12/2014 | Trimble et al. |
| 2001/0016896 | A1 | 8/2001 | Pitts |
| 2002/0023139 | A1 | 2/2002 | Hultgren |

(Continued)

OTHER PUBLICATIONS

Probabilistic Shared Cache Management (PriSM), Manikantan et al., Department of Computer Science and Automation, Indian Institute of Science, Bangalore, Aug. 2012.

*Primary Examiner* — Clayton R Williams
(74) *Attorney, Agent, or Firm* — Ansari Katiraei LLP; Arman Katiraei; Sadiq Ansari

(57) ABSTRACT

Some embodiments set forth probability based caching, whereby a probability value determines in part whether content identified by an incoming request should be cached or not. Some embodiments further set forth probability based eviction, whereby a probability value determines in part whether cached content should be evicted from the cache. Selection of the content for possible eviction can be based on recency and/or frequency of the content being requested. The probability values can be configured manually or automatically. Automatic configuration involves using a function to compute the probability values. In such scenarios, the probability values can be computed as a function of any of fairness, cost, content size, and content type as some examples.

14 Claims, 12 Drawing Sheets

(56) References Cited

U.S. PATENT DOCUMENTS

| | | |
|---|---|---|
| 2002/0169926 A1 | 11/2002 | Pinckney, III et al. |
| 2003/0088739 A1 | 5/2003 | Wilkes et al. |
| 2003/0229760 A1 | 12/2003 | Doyle et al. |
| 2004/0054860 A1 | 3/2004 | Dixit et al. |
| 2007/0079070 A1 | 4/2007 | Piry et al. |
| 2009/0100224 A1 | 4/2009 | Wang |
| 2009/0119455 A1 | 5/2009 | Kisel et al. |
| 2009/0193064 A1 | 7/2009 | Chen et al. |
| 2009/0216709 A1 | 8/2009 | Cheng et al. |
| 2010/0082907 A1* | 4/2010 | Deolalikar ......... G06F 12/0888 711/133 |
| 2012/0054447 A1* | 3/2012 | Swart ................. G06F 12/0888 711/136 |
| 2013/0179533 A1* | 7/2013 | Osuga .................... G06F 3/061 709/213 |
| 2013/0198351 A1 | 8/2013 | Widjaja et al. |
| 2015/0312367 A1* | 10/2015 | Huici ................. H04L 67/2842 709/213 |

\* cited by examiner

210

| Randomly Generated Outcome Value | CP_1 Probability Value = 0.8 | CP_2 Probability Value = 0.5 |
|---|---|---|
| 1 | Do Not Cache | Do Not Cache |
| 0.9 | Do Not Cache | Do Not Cache |
| 0.8 | Cache | Do Not Cache |
| 0.7 | Cache | Do Not Cache |
| 0.6 | Cache | Do Not Cache |
| 0.5 | Cache | Cache |
| 0.4 | Cache | Cache |
| 0.3 | Cache | Cache |
| 0.2 | Cache | Cache |
| 0.1 | Cache | Cache |

FIG. 2

PROBABILITY BASED CACHING AND EVICTION

CLAIM OF BENEFIT TO RELATED APPLICATIONS

This application is a continuation of U.S. nonprovisional application Ser. No. 14/293,368 entitled "PROBABILITY BASED CACHING AND EVICTION", filed Jun. 2, 2014. The contents of application Ser. No. 14/293,368 are hereby incorporated by reference.

TECHNICAL FIELD

The present invention relates to content caching, and more specifically, to determining when to cache content and when to evict content from cache.

BACKGROUND ART

Content caching is used by many networks and service provider to optimize the delivery of digital content. Copies of the same content are cached by different servers distributed throughout the network. When a request for the cached content comes in, the request can be routed to the optimal server that serves the requested content in the most expedient manner. The optimal server can be determined based various criteria including geographic proximity to the user, load, available resources, etc.

However, all caching servers have a finite or limited amount of storage that can be used as cache. When the cache of a particular caching server is filled, additional content may be cached by evicting other content from the cache. The caching servers are configured with caching methodologies to manage how and what content is stored to cache and eviction methodologies to manage how and what content is evicted from cache in order to free space for new content to be cached.

Some common caching methodologies implement first-hit or n-hit caching, whereby content is cached after the caching server receives one or n requests for the content. These caching policies are implemented to be lightweight so as to be able to handle high demand without creating a bottleneck.

Least recently used (LRU) and least frequently used (LFU) are two common eviction methodologies. Under LRU, content is evicted from cache according to recency of requests. Under LFU, content is evicted from cache according to frequency of requests.

From a holistic perspective, these caching and eviction methodologies appear to adequately manage the cache storage while being lightweight so as to not create a bottleneck during times of high demand. However, closer analysis reveals various inefficiencies with these prior art methodologies. Under these methodologies, a few content providers can disproportionately consume the cache at the expense of other content providers. Consequently, only a few content providers benefit from the efficiencies afforded by the cache, while other content providers receive little or no such benefit. These inefficiencies primarily arise because the prior art caching and eviction methodologies treat content or content providers the same. As a result, a first content provider with ten times more content than a second content provider could have a tenfold greater cache footprint than the second content provider even when the content of the second content provider is served from the cache more often than the content of the first content provider. Similarly, a first content provider with large sized content could have a larger cache footprint than a second content provider with small sized content even when the small sized content is served from the cache more often than the large sized content.

Accordingly, there is a need to better manage how and what content is stored to cache and evicted from cache. There is a need for smarter caching and eviction methodologies that provide differentiated and configurable access to the cache.

SUMMARY OF THE INVENTION

It is an objective to provide differentiated access to cache storage. It is an objective to provide such differentiated access by varying probability that different content will be cached to and evicted from the cache storage. It is further an objective to leverage the differentiated access in order to provide fair and configurable access to the cache storage.

To achieve these and other objectives, some embodiments provide smart caching and smart eviction systems and methodologies. These systems and methodologies provide differentiated access to cache storage by varying the probability with which different content or content of different content providers is cached to and evicted from cache. In some embodiments, the probability is determined as a function of any of fairness, cost, content size, and content type as some examples.

The smart caching systems and methodologies of some embodiments implement probability based caching whereby a probability value determines whether content identified by an incoming request should be cached or not. Specifically, for a probability p, the probability that a specific item is cached in n requests is $(1-(1-p)^n)$ and the probability that the specific item is not cached in n requests is $(1-p)^n$. In some embodiments, a different probability value is generated for each item of content or for each content provider. The probability value can be scaled or increased with each incoming request that does not result in the content being cached for those embodiments related to smart caching. Alternatively, the probability value can be scaled or increased with each incoming request that does not result in the content being evicted from cache for those embodiments related to smart eviction. The probability based smart caching can be combined with existing caching methodologies such as n-hit caching.

Similarly, the smart eviction systems and methodologies of some embodiments implement probability based eviction whereby a probability value determines whether content should be evicted from or retained in cache storage. The probability based eviction can be implemented in conjunction with existing eviction methodologies such as the least recently used (LRU) policy or the least frequently used (LFU) methodologies.

In some embodiments, a purge threshold is used to determine when to perform the smart eviction. Periodically, a check is made to the cache storage to determine whether the cache size exceeds the purge threshold. If not, the cache content is untouched. Otherwise, LRU or LFU is used to provisionally select a cached item of content from cache storage based on its recency or frequency. A probability value is then used to determine whether or not to remove the provisionally selected item of content from cache storage.

Probability values can be assigned to each item of requested content or to each content provider that provides the requested content. The probability value(s) for either smart caching or smart eviction can be a value that is set by a cache administrator. In some embodiments, the probability value(s) for either smart caching or smart eviction can be a function of any of several factors upon which access to the cache storage is conditioned.

In some embodiments, the probability is a function of fairness. Fairness ensures that the cache storage is divided evenly among content providers. Generally, fairness is a measure of how fairly any particular content provider behaves relative to others in terms of cache storage consumption and usage. More specifically, fairness is a ratio of the percentage of the cache footprint consumed by a content provider to the percentage of bytes served for that content provider's content.

The probability of caching or evicting content of a particular content provider as a function of fairness is computed in some embodiments as (CFcp/CFtotal)/(BScp/BStotal) wherein CFcp is the content provider's cache footprint on a particular caching server, CFtotal is the particular caching server's total cache footprint, BScp is the number of bytes for the content provider's content that is served by the particular caching server, and BStotal is the total number of bytes served by the particular caching server for all content provider content. The resulting fairness value for each content provider is then ordered to a list. The fairness value at some percentile (e.g., the 95$^{th}$ percentile) within the list is selected as a normalizing value. Any content provider whose resulting fairness value equals or is greater than the percentile value is assigned a probability of 1. The probability for all other content providers is computed as the fairness value of the content provider divided by the normalizing value.

The resulting probabilities can then be used to determine when to store content in cache as part of a smart caching policy and can be used to determine when to evict content from cache as part of a smart eviction policy. As an example for probability based smart caching, when the percentage of the cache footprint that is consumed by a particular content provider is high in comparison to the number of bytes for the particular content provider content served by the server, that particular content provider will be assigned a probability value to decrease the likelihood for caching that particular content provider's content. As an example for probability based smart eviction, when the percentage of the cache footprint that is consumed by a particular content provider is high in comparison to the number of bytes for the particular content provider content served by the server, that particular content provider will be assigned a probability value to increase the likelihood for evicting that particular content provider's content from cache.

In some embodiments, the probability is a function of cost. In some such embodiments, content provider content is cached according to the amount of access that the content provider pays for. For smart caching, content providers that pay for greater access will be configured with a probability that increases the chance that their content is cached relative to other content providers that do not pay for the greater access. For smart eviction, content providers that pay for greater access will be configured with a probability that decreases the chance that their content is removed from cache when provisionally selected.

In some embodiments, the probability is a function of content size. In some such embodiments of smart caching, content having a smaller size is provided a probability to increase its likelihood of being cached relative to content having a larger size. Similarly, in some such embodiments of smart eviction, the smart eviction policy is configured such that content having a larger size has a greater probability of being evicted than content having a smaller size. Such smart caching or smart eviction optimizes the cache storage to cache more content. This caching behavior is desired when large content disproportionately consumes the cache. Conversely, the content size function can be configured to provide the inverse behavior. The inverse behavior prioritizes larger content over smaller content. This may be desired when the performance penalty in a cache miss resulting from larger sized content is greater than that of smaller sized content and it is an objective to minimize such performance penalties.

In some scenarios, the caching server cache is consumed by content that is only partially served. In such scenarios, the remainder of the content is also in cache, taking up unnecessary cache storage that can be otherwise better allocated. This occurs for certain type of content such as media content, whereas other content such as images, text, and applications are almost always entirely served. Accordingly, in some embodiments, the probability is a function of content type. In some such embodiments, a particular type of content that is often partially served is provided a lower probability to decrease its likelihood of being cached relative to other types of content that are often entirely served. Similarly, for smart eviction, the caching server is configured such that the particular type of content that is often partially served has a greater probability of being evicted from cache than other types of content that are often entirely served. Here again, the function can be configured to provide the inverse cache behavior whereby the partially served content is prioritized over the wholly served content on the basis of content type.

In summary, the smart caching systems and methodologies set forth herein condition the decision on whether or not to cache content to cache storage of a caching server in part based on a probability value that is a function of one of several caching factors. Similarly, the smart eviction systems and methodologies set forth herein condition the decision on whether or not to remove content from cache storage of a caching server in part based on a probability value that is again a function of one of several caching factors. The probability value that is computed for particular content or a content provider originating that particular content determines the likelihood that the particular content will be cached when performing probability based smart caching and will be evicted from cache when performing probability based smart eviction.

BRIEF DESCRIPTION OF THE DRAWINGS

In order to achieve a better understanding of the nature of the present invention, a preferred embodiment for the probability based smart caching and smart eviction systems and methods will now be described, by way of example only, with reference to the accompanying drawings in which:

FIG. 2 conceptually illustrates operation of the probability based smart caching of some embodiments.

DETAILED DESCRIPTION

Figure 1:
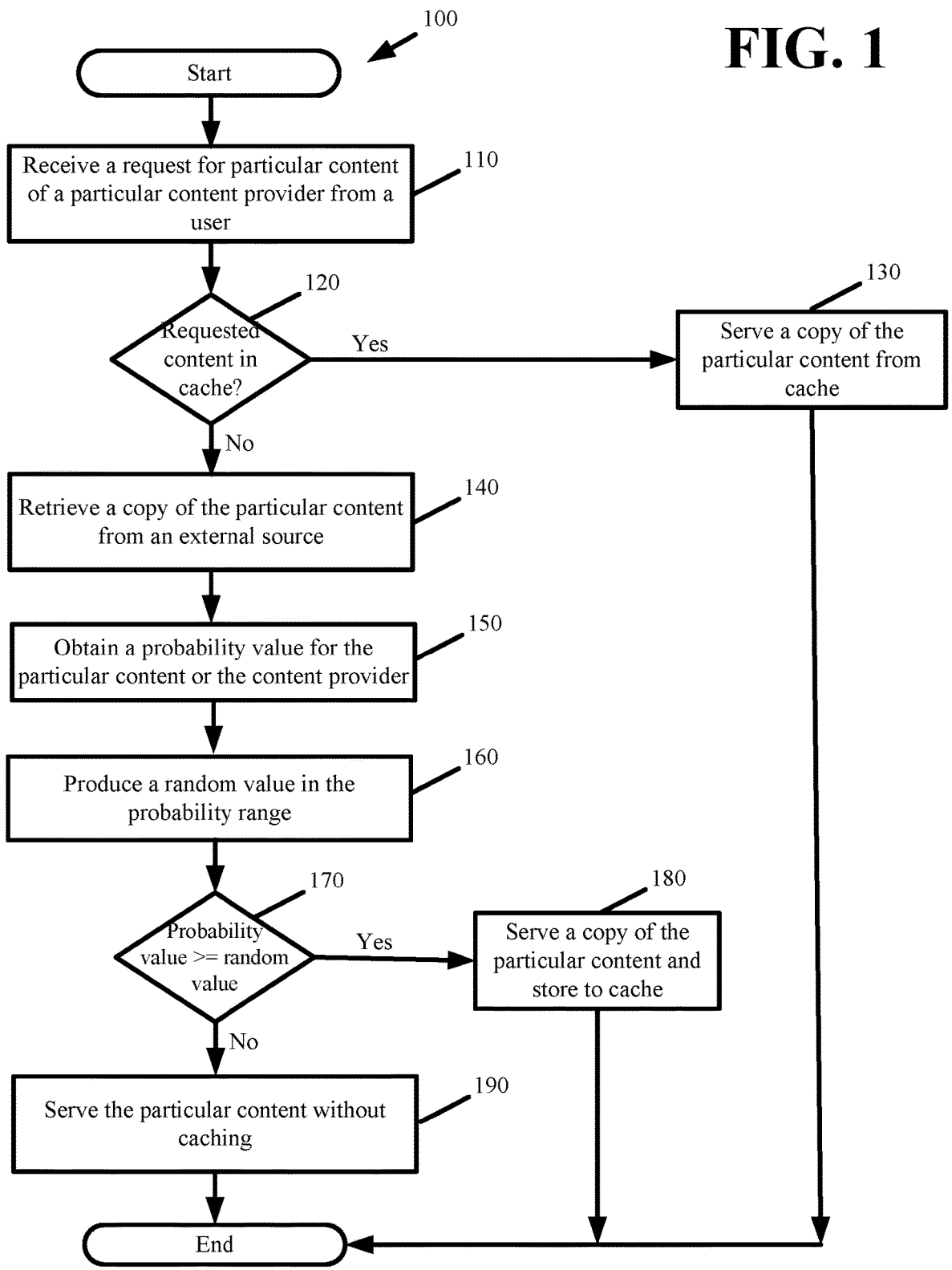
FIG. 1 presents a process performed by a caching server implementing the probability based smart caching in accordance with some embodiments.

In the following detailed description, numerous details, examples, and embodiments are set forth and described. As one skilled in the art would understand in light of the present description, the described systems and methods are not limited to the embodiments set forth, and these systems and methods may be practiced without some of the specific details and examples discussed. Also, reference is made to the accompanying figures, which illustrate specific embodiments in which the invention can be practiced. It is to be understood that other embodiments can be used and structural changes can be made without departing from the scope of the embodiments herein described.

I. Overview

Some embodiments set forth smart caching systems and methodologies that provide probability based caching, also referred to as probabilistic caching of content. Some embodiments also set forth smart eviction systems and methodologies that provide probability based eviction, also referred to as probabilistic eviction or purging of content. These systems and methodologies provide fair or controlled configurable access to cache storage.

A simplistic example is now given to illustrate the benefit offered by the smart caching and smart eviction systems and methodologies of some embodiments. Specifically, the example illustrates how these systems and methodologies provide fair or configurable access to cache storage in order to prevent a large content provider or customer that uses the cache from pushing out smaller content providers or customers that also use the cache, albeit in a more limited capacity. Assume a cache that can store four items of content. Also assume a first content provider that offers four items of content that can be stored to the cache and a second content provider that offers only one item of content that can be stored to the cache. In this scenario, the first content provider consumes 75% of the cache at all times and 100% of the cache sometimes. The second content provider consumes at most 25% of the cache when its one item of content is cached or 0% of the cache when its one item of content is removed in order to store a fourth item of content of the first content provider. The probability based smart caching of some embodiments uses probabilities to increase the likelihood that the second content provider content is stored in cache relative to the first content provider content. Additionally or alternatively, the probability based smart eviction of some embodiments uses probabilities to decrease the likelihood that the second content provider content will be removed from the cache and increases the likelihood that the first content provider content will be removed from the cache when space is needed in the cache to store new content. In this manner, the first content provider is prevented from disproportionately consuming the cache such that both content providers can benefit from the cache.

The probability based smart caching and smart eviction systems and methodologies of some embodiments are implemented on caching servers or other special purposed machines having at least a storage medium that is operated as a cache, a processor that manages the cache according to the smart caching and/or smart eviction methodologies, and a network interface over which the caching server distributes content to various end users and over which the caching server receives content of different content providers for possible caching and distribution. Further detail for the machines that implement the smart caching and smart eviction systems and methodologies is provided by FIG. 13 and its corresponding disclosure below.

Each caching server implementing the probability based smart caching or smart eviction systems and methodologies can be operated independently or as part of a server farm having multiple servers that are collocated or distributed across multiple geographic regions. A content delivery network (CDN) is an example of a server farm operator. In general, the systems and methodologies are directed to any provider of online content and any networked machine with a cache used in storing and serving different content.

II. Probability Based Smart Caching

The probability based smart caching of some embodiments uses a probability value to determine whether content identified by an incoming request should be cached or not. For a probability p, the probability that a specific item is cached in n requests is $(1-(1-p)^n)$ and the probability that the specific item is not cached in n requests is $(1-p)^n$.

In some embodiments, a different probability value is used for each item of content or each content provider that originates the content. Computation of the probability value is described in Section IV below. In some embodiments, the caching server implementing the probability based smart caching maintains the probability values for the different content or different content providers. In some other embodiments, the caching server obtains the probability values from another server that is in charge of maintaining the probability values for the different content or different content providers.

FIG. 1 presents a process 100 performed by a caching server implementing the probability based smart caching in accordance with some embodiments. The process 100 commences by receiving (at 110) a request for particular content from a user. The request is typically a Hypertext Transfer Protocol (HTTP) GET request, though other request formats can also be received. The request typically includes an identifier for identifying the particular content. The identifier may be a uniform resource locator (URL). The URL identifies the particular content with a file name. The URL also normally specifies a path from which the content provider that originates the particular content can be identified.

Using the request identifier, the process determines (at 120) whether the particular content being requested is already in cache or not. This involves performing a lookup or query of the cache or a cache table. If the particular content is already in cache, a copy of the particular content is retrieved from the cache and served (at 130) to the requesting user. If the content does not reside in cache, the process retrieves (at 140) a copy of the particular content from an external source. The external source can include a server of the content provider or some second tier caching server. Contemporaneously, the process obtains (at 150) a probability value for either of the particular content or the content provider that is identified from the request identifier. The probability value is a numeric value that determines the likelihood that the particular content will be cached based on the current request. The process uses a random number generator to produce (at 160) a random number in the probability range. The random number is also referred to as the outcome value because it is used in determining whether or not to cache the requested content. Specifically, based on a comparison (at 170) of the random number and the probability value, the process either caches and serves (at 180) the particular content or serves (at 190) the particular content without caching. Equation 1 provides pseudo-code for steps 150-190:

If ((rand( ) % 100)<(probability value)) then (cache and serve) else (serve)   (1)

FIG. 2 conceptually illustrates operation of the probability based smart caching of some embodiments. The figure provides a table 210 identifying which randomly generated outcome values will cause the caching server to cache content of a first content provider with a probability value of 0.8 and which randomly generated outcome values will cause the caching server to cache content of a second content provider with a second probability value of 0.5. In this figure, the outcome values range from 0.1 to 1. Accordingly, the probability value of 0.8 indicates that the first content provider has an 80% likelihood of its content being cached and the probability of 0.5 indicates that the second content provider has a 50% likelihood of its content being cached. In other words, if the randomly generated outcome value is greater than 0.8, then a request for the first content provider content or the second content provider content will not result in any content being cached; if the randomly generated outcome value is between 0.8 and 0.5, then a request for the first content provider content will result in the content being cached; and if the randomly generated outcome value is less than 0.5, then requests for either the first content provider content or the second content provider content will result in the content being cached. In contrast, a first-hit caching implementation would cause both the first content provider content and the second content provider content to be cached after the first request, whereas a second-hit caching implementation would not cache either the first content provider content or the second content provider content until a subsequent second request is received at the caching server. It should therefore be evident how the smart caching of some embodiments provides differentiated cache access, whereas the prior art n-hit implementations do not.

In some embodiments, the probability values are periodically recomputed according to one or more factors. One such factor can include be the hit count for content or content providers. As the hit count for specific content or content of a specific content provider increases, the probability value for caching the specific content or content of the specific content provider can be scaled. For example, a particular content provider may be assigned a probability value of 0.2. On an initial request for the particular content provider content, there is a 20% likelihood of the requested content being cached. After a first request for the particular content provider's content does not result in the content being cached, a probability scalar may modify the probability value to provide a 40% likelihood of caching the particular content provider's content on a second request. If the second request for the particular content provider's content also does not result in the content being cached, then the probability scalar is again used to rescale the probability value to provide a 60% likelihood of caching the particular content provider's content on a third request. This continues until a threshold is met or the content is cached. Once the particular content provider's content is cached, the probability value can be reset to its original value.

Time can be another factor for recomputing the probability values. In this scenario, the probability for caching specific content or content of a specific content provider is increased or decreased the more time that passes prior to the specific content or content of the specific content provider being cached. Once the specific content or content of the specific content provider content is cached, the probability value can be reset to its original value and gradually scaled up or down as specified by the time factor.

Cache fairness is yet another factor that can be used to recompute the probability values of some embodiments. Cache fairness scales the probability values used in caching content of a specific content provider based on how much of the total cache footprint is currently consumed by content of that specific content provider. As an example, if a first content provider has none of its content in cache and a second content provider has content that consumes 20% of server cache, then based on the cache fairness factor a first probability value for caching the first content provider content is modified to increase the chance of the first content provider content being cached and a second probability value for caching the second content provider content is modified to decrease the chance of the second content provider content being cached. In this example, the first and second probability values will fluctuate as the cache usage by the first and second content providers changes over time.

Cost can also be used as a factor for recomputing the probability values of some embodiments. Those content providers that pay for improved service will have their probability values modified to increase the likelihood of their content being cached relative to another content provider that does not pay for the improved service. The cost factor can also have a time element, wherein content providers pay for improved service during a particular time of day, week, month, or year. For example, the content provider may desire improved service during business hours. Accordingly, that the probability value for that content provider is adjusted during business hours to increase the likelihood of that content provider's content being cached and adjusted again outside business hours to decrease the likelihood of that content provider's content being cached.

The probability based smart caching can also be configured to operate in conjunction with other existing caching methodologies. One such approach combines the probability based smart caching with n-hit caching. As noted above, n-hit caching is a methodology whereby content is cached after it is requested n times (i.e., a defined minimum number) within some interval of time. In some embodiments of this combined caching approach, hits for specific content begin to be counted only after one request for the specific content satisfies the probability comparison. As an example, a server may receive three requests for specific content, but only two hits are counted because the outcome value that is generated for the first request is greater than the probability value such that the first request does not satisfy the probability comparison and is not counted as a hit. Continuing with the example, the outcome value that is generated for the second request is less than the probability value thereby satisfying the probability comparison, counting as a hit, and causing the third request to automatically be counted as a hit without performing the probability comparison for the third request. In some other embodiments of this combined caching approach, each request must by itself satisfy the probability comparison before it is counted as a hit. The specific content is then cached when the total number of counted hits meets or exceeds the n-hit value or specified minimum number of hits for caching of the content.

Figure 3:
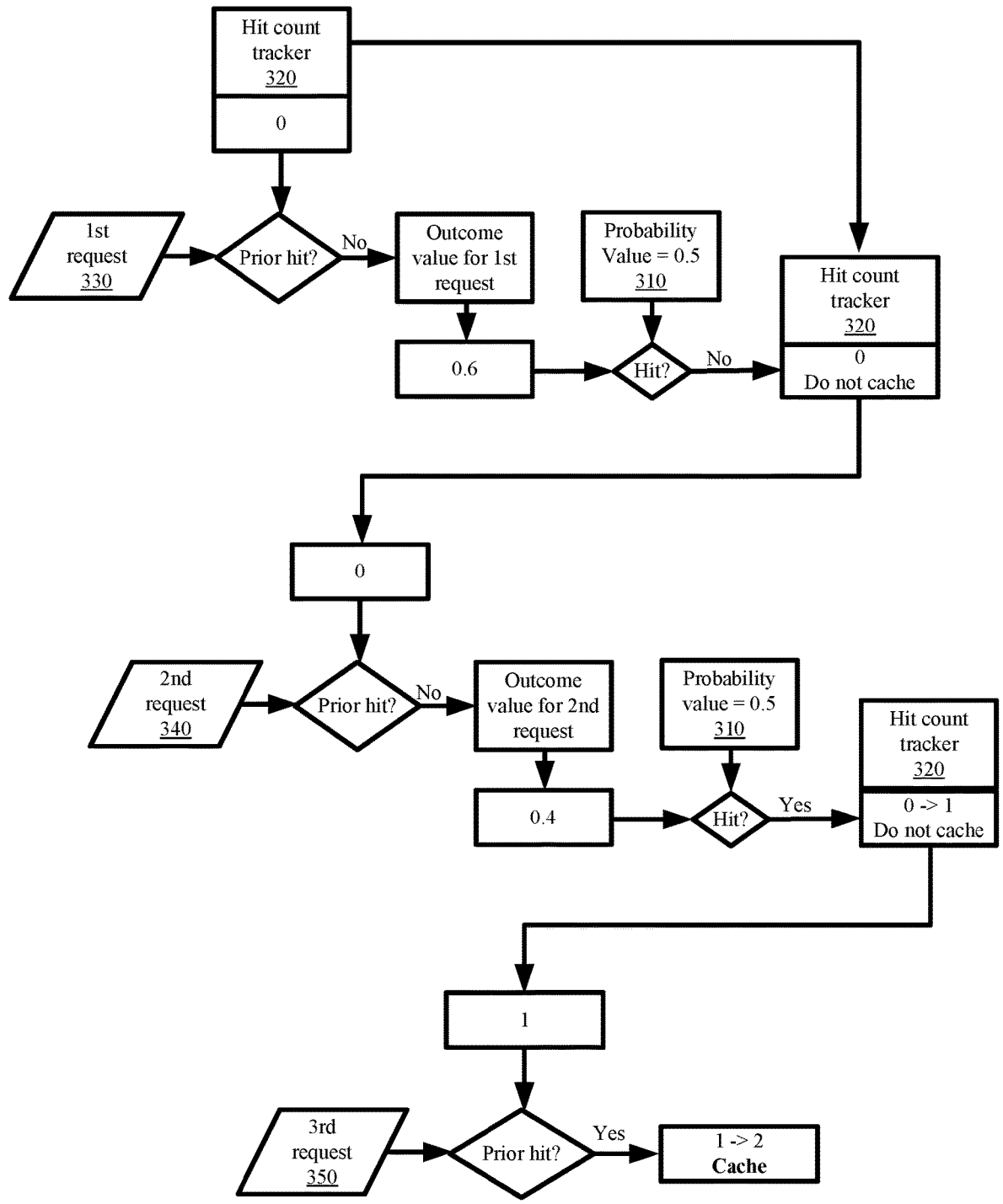
FIG. 3 illustrates a combined probability based smart caching and second-hit caching implementation in accordance with some embodiments, whereby requests for specific content that is not cached are counted as hits once one specific content request satisfies the probability comparison.

FIG. 3 illustrates a combined probability based smart caching and second-hit caching implementation in accordance with some embodiments, whereby requests for specific content that is not cached are counted as hits once one specific content request satisfies the probability comparison. FIG. 3 describes a second-hit caching implementation rather than an n-hit caching implementation in order to simplify the discussion. However, it should be evident that the implementation can be easily adapted for an n-hit caching implementation. FIG. 3 depicts a probability value 310 for determining when requests are counted as hits, a hit count tracker 320 for particular content, and three requests 330, 340, and 350 for the particular content that arrive sequentially.

For each request, the smart caching implementation checks the hit count tracker 320 to determine if a prior request has satisfied the probability comparison and has been recorded as a hit. When the first request 330 is received, the hit count tracker 320 does not have a hit recorded for the particular content. This indicates that the probability comparison has not yet been satisfied for the particular content. Accordingly, the probability comparison is performed by generating a random outcome value and determining if the outcome value satisfies the probability value 310. As shown in the figure, the first request 330 is not counted as a hit because the outcome value generated for that request 330 does not satisfy the probability value 310. Accordingly, the hit count tracker 320 is not incremented and the particular content hit count remains at zero after the first request 330. The server performing this smart caching implementation responds to the first request 330 by retrieving the particular content from an external source and by passing the particular content to the requestor without locally caching the particular content.

When the second request 340 is received, the hit count tracker 320 still does not have a hit recorded for the particular content. Accordingly, the probability comparison is again performed by generating a random outcome value and determining if the outcome value satisfies the probability value 310. In this case, the second request 340 is counted as a hit because the outcome value generated for that request 330 satisfies the probability value 310. Accordingly, the hit count tracker 320 is incremented such that the particular content hit count is now one. The server responds to the second request 340 by retrieving the particular content from an external source and by passing the particular content to the requesting user without caching it locally, because a second hit has not yet been counted even though two requests for the particular content have been received.

When the third request 350 is received, the check to the hit count tracker 320 reveals that a hit has been recorded for the particular content. The third request 350 is therefore counted as a second hit without performing the probability comparison. The recorded second hit satisfies the second hit caching requirement such that the corresponding server responds to the third request 350 by retrieving the particular content from an external source, caching it locally, and serving it to the requesting user. The hit count tracker 320 can again be incremented to record the second hit and thereby indicate that the particular content is now cached by the server. Subsequent requests for the particular content can be satisfied from cache without accessing the external source.

Figure 4:
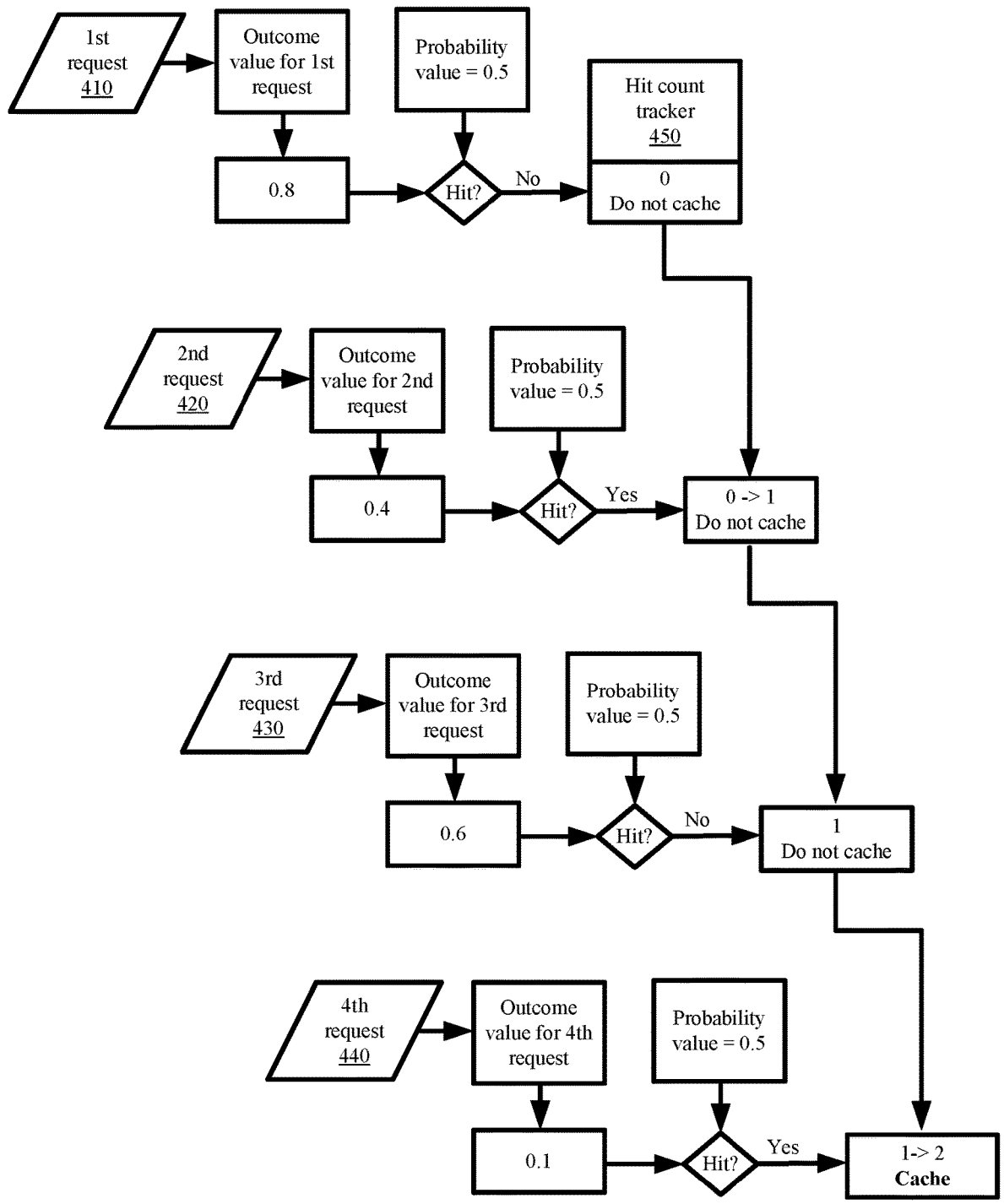
FIG. 4 illustrates a combined probability based smart caching and second-hit caching implementation in accordance with some embodiments, whereby each request for content that is not cached must satisfy the probability comparison before being counted as a hit.

A variation of the implementation illustrated by FIG. 3 is demonstrated in FIG. 4. In this combined probability based smart caching and second-hit caching implementation, each request for content that is not cached must satisfy the probability comparison before it is counted as a hit.

In FIG. 4, a first request 410 for the particular content does not satisfy the probability comparison. Accordingly, the hit count tracker 450 is not incremented and the particular content hit count remains at zero after the first request 410. A second request 420 for the particular content satisfies the probability comparison and is therefore counted as a first hit by incrementing the hit count tracker 450. A third request 430 for the particular content does not satisfy the probability comparison and is not counted as a hit by the hit count tracker 450.

Through these first three requests 410, 420, and 430, the hit count tracker 450 has not recorded a second hit and, as a result, the corresponding server performing the smart caching does not cache the particular content when responding to the requests 410, 420, and 430. The hit count tracker 450 does not record the second hit for the particular content until a fourth request 440 for the particular content satisfies the probability comparison. However, once this second hit is counted, the server responds to the fourth request 440 by retrieving the particular content from an external source, caching it locally, and passing it to the requesting user.

Figure 5:
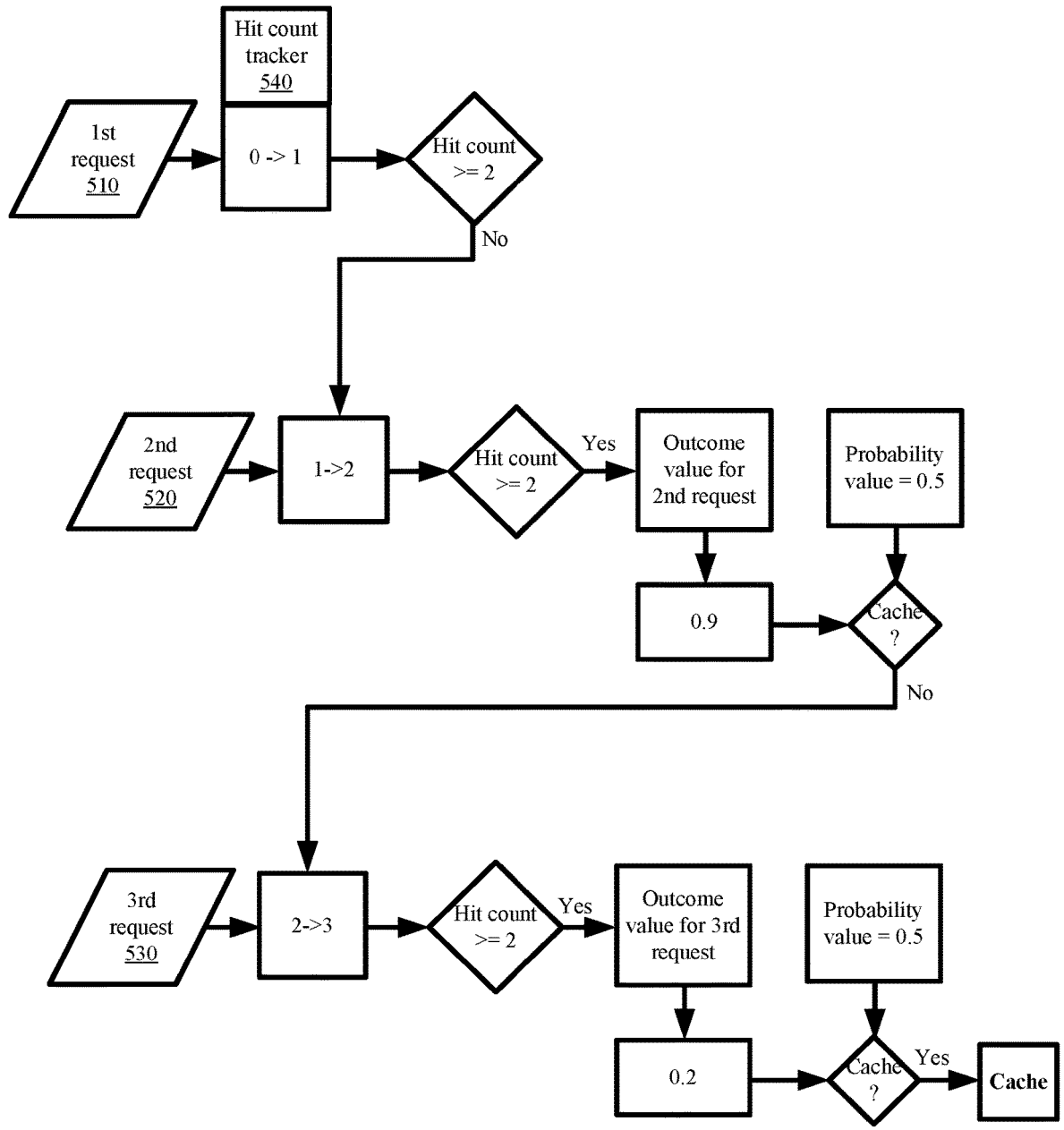
FIG. 5 illustrates a combined probability based smart caching and second-hit caching implementation in accordance with some embodiments, whereby each request for content that is not cached is counted as a hit with the probability comparison being performed once the second hit is counted and the content being cached once the probability comparison is satisfied.

Still another variation of the combined probability based smart caching and second-hit caching implementation is illustrated in FIG. 5. In FIG. 5, each request for content that is not cached is counted as a hit with the probability comparison being performed once the second hit is counted and the content is cached once the probability comparison is satisfied.

As shown in FIG. 5, a first request 510 increments the hit count tracker 540 for the particular content from zero to one. Since the hit count is less than the number of hits required for caching, the probability comparison is not performed for the first request 510. The server responds to the first request 510 by retrieving the particular content from an external source and by passing the particular content to the requestor without locally caching the particular content.

A second request 520 increments the hit count tracker 540 again, changing the hit count from one to two. At this stage, a sufficient number of hits for caching have been counted and the probability comparison is performed in order to determine whether to cache the content. The generated outcome value, however, does not satisfy the probability value. Consequently, the server again responds to the request without locally caching the particular content.

The hit count necessary for caching content is still met when a third request 530 is received. Again, the probability comparison is performed in order to determine whether to cache the content. Accordingly, the server generates the outcome value for the probability comparison and in this case, the comparison is satisfied causing the server to cache the content when responding to the third request 530.

The smart caching techniques can also be adapted for hierarchical caching. In some such embodiments, content can be cached in any of at least two different caching tiers with a first caching tier being larger but slower than a second caching tier. The first tier can include mechanical or solid state disk, while the second tier can include kernel cache that is implemented in main memory. In some such embodiments, a different probability value can be specified for each cache tier to provide different controls for when content is cached to either the first or second caching tiers.

Figure 6:
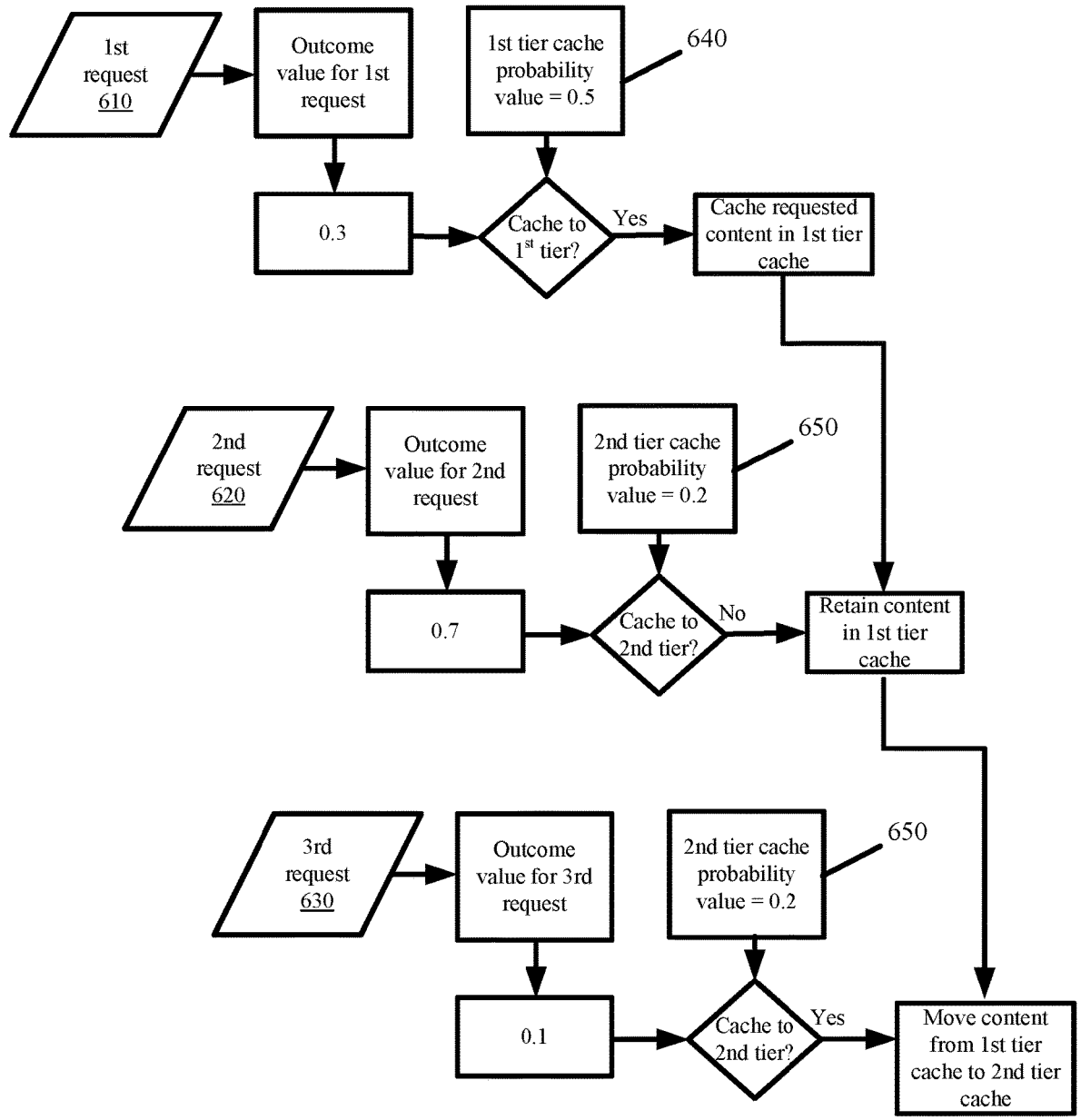
FIG. 6 illustrates a hierarchical probability based caching implementation in accordance with some embodiments.

FIG. 6 illustrates a hierarchical probability based caching implementation in accordance with some embodiments. The figure illustrates three requests 610, 620, and 630 that a server receives for particular content. The first request 610 causes the particular content to be cached to the first cache tier because the outcome value generated for the first request 610 satisfies a first probability value 640 that controls which content is cached to the first cache tier. In responding to the first request 610, the server implementing the hierarchical probability based caching will retrieve the particular content from an external source, cache the particular content locally, and serve it to the requestor.

The second request 620 generates a greater random value than that for the first request 610, however the value does not satisfy the second probability value 650 that is configured for promoting content from the first tier cache to the second tier cache. Accordingly, the server responds to the second request 620 by retrieving the particular content from the first cache tier and by serving it to the requestor.

The third request 630 generates a random value that satisfies the second probability value 650. Consequently, the particular content is cached to the smaller but faster second tier cache such that subsequent requests for the particular content can be served from the second tier cache.

By configuring the different probability values for the different caching tiers, an administrator can better control how much content is cached at each tier. It should also be noted that any of the above n-hit or second-hit caching techniques can be used at the first cache tier and/or the second cache tier to limit the cached content based on a combination of a number of hits and probability.

III. Probability Based Smart Eviction

While controlling what gets cached is one means of providing fair and configurable access to cache storage, another means of control is through cache eviction or controlling which content is removed from cache in order to free space for caching other content. Accordingly, some embodiments provide probability based smart eviction to compliment or act independent of the probability based smart caching. In probability based smart eviction, the decision to remove or retain content in cache is based in part on a probability value. The probability values used for smart eviction can be the same ones used for smart caching. Alternatively, the probability values used for smart eviction can be derived independent of those used for smart caching.

Figure 7:
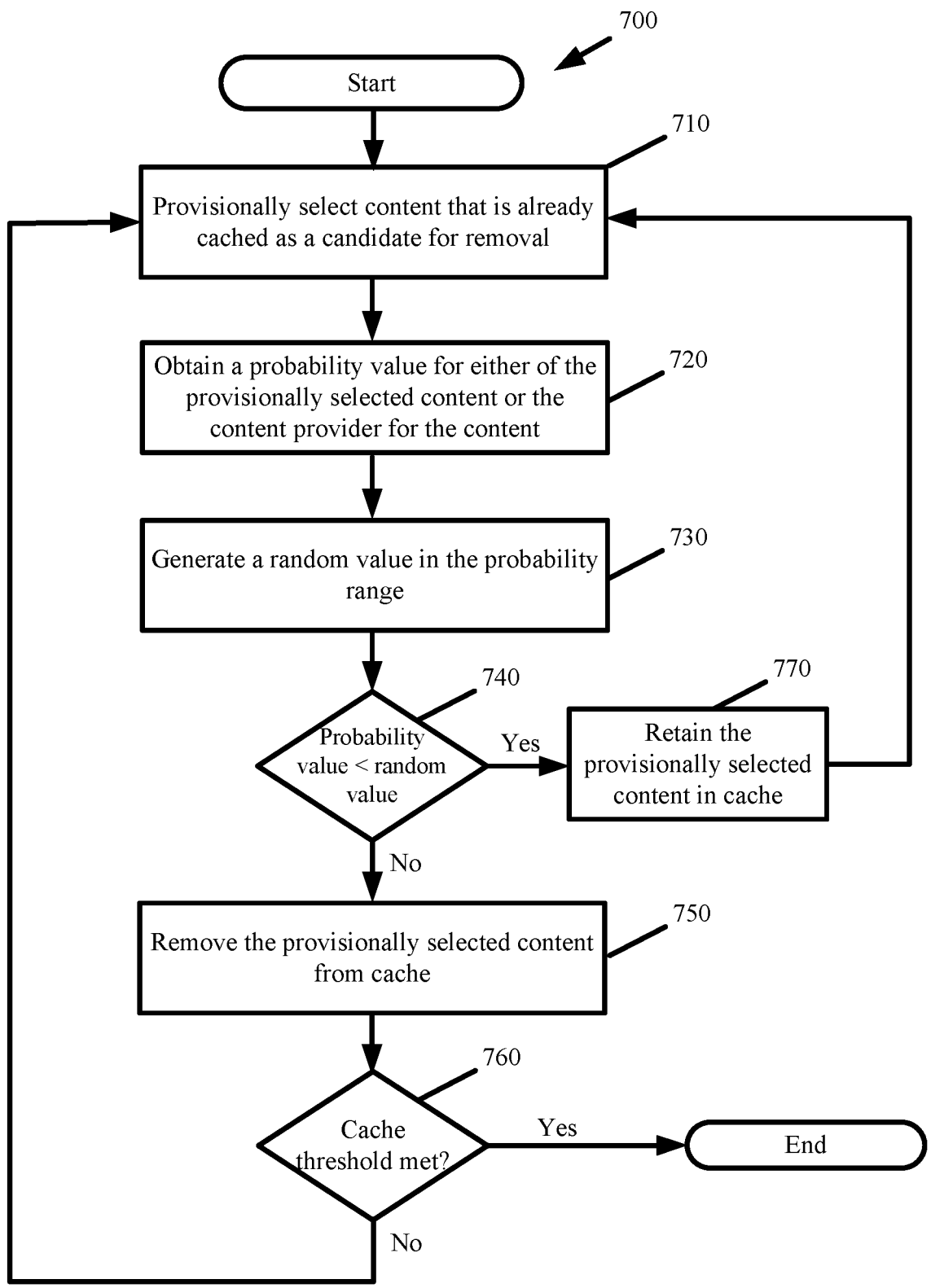
FIG. 7 presents a process performed by a caching server to evict content from caching according to the probability based smart eviction of some embodiments.

FIG. 7 presents a process 700 performed by a caching server to evict content from cache according to the probability based smart eviction of some embodiments. Process 700 or the probability based eviction in general can be performed at regular intervals, whenever the cache size exceeds a specified cache size threshold, or whenever requests for cacheable content are received.

In performing the probability based smart eviction, the process first provisionally selects (at 710) content that is already cached as a candidate for removal. Once an item of cached content is provisionally selected, the process then obtains (at 720) a probability value associated with the provisionally selected content. Specifically, the process obtains a probability value for the provisionally selected item of content or the content provider whose content has been provisionally selected. The probability value can be maintained by the caching server performing the probability based smart eviction or by an external source to which the caching server is communicably coupled.

The process generates (at 730) a random outcome value using a random number generator. The outcome value will be a value within the probability value range. The process then compares (at 740) the probability value to the outcome value.

When the result of the comparison indicates that the provisionally selected content should be removed, the process deletes (at 750) the cached copy of the provisionally selected content from the cache storage. The process can then end or continue by checking (at 760) a cache size threshold. In some embodiments, the cache size threshold is a value specifying a minimize amount of free cache storage to ensure that the cache does not overflow. Stated differently, the cache size threshold is a maximum allowable size for the cache. Should the size of the cache (i.e., aggregate amount of cached content) exceed the cache size threshold, then additional content needs to be removed. If enough space was freed and the cache size threshold is met, the process ends. Otherwise, the process repeats by provisionally selecting (at 710) a different item of cached content as a candidate for removal.

When the result of the comparison indicates that the provisionally selected content should not be removed, the process retains (at 770) the provisionally selected content in cache. In such cases, the process deselects the content and repeats by provisionally selecting (at 710) a different or next item of cached content as a candidate for potential removal. The process may continue in this fashion until at least one item of cached content is removed, until some number of cached content has been provisionally selected, or until some amount of cached content is removed from cache.

Figure 8:
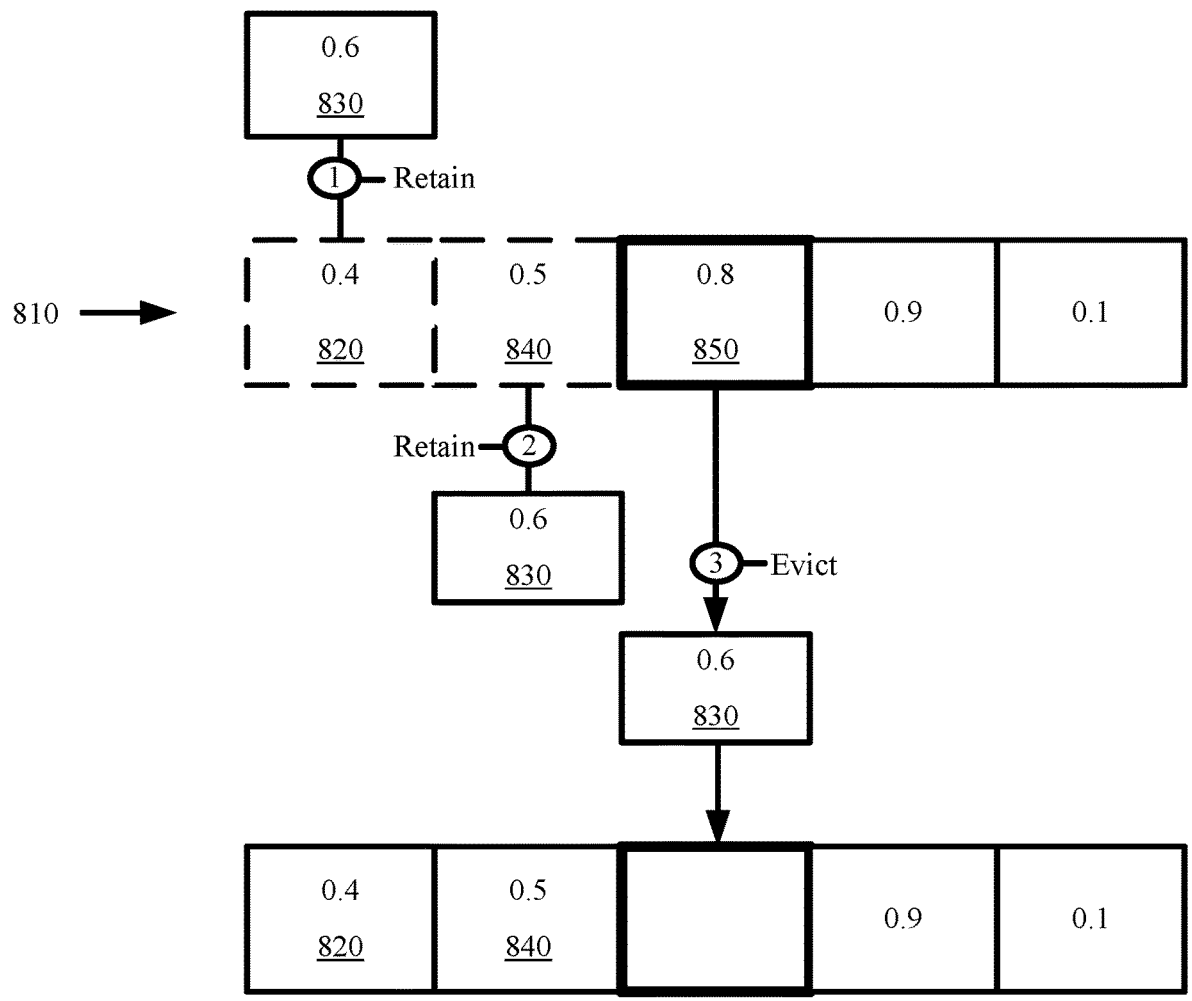
FIG. 8 conceptually illustrates operation of the probability based smart eviction of some embodiments.

FIG. 8 conceptually illustrates operation of process 700 and the probability based smart eviction of some embodiments. The figure provides a cache 810 storing five different content. Depicted within the cache 810 are the probability values associated with each item of cached content. Each probability value indicates the likelihood of the corresponding content being evicted from the cache. In other words, the probability value of 0.4 for the first item of content 820 indicates that the first item of content 820 has a 40% likelihood of being evicted from the cache. In performing the probability based smart eviction, an outcome value 830 is randomly generated to compare against the content probability values. In this figure, the outcome value 830 is 0.6.

The smart eviction begins by provisionally selecting the first item of cached content 820 and comparing the probability value 0.4 for the first item of cached content 820 to the outcome value 830 of 0.6. Since the probability value for the first item of cached content is less than the outcome value 830, the first item of cached content is retained in cache. The smart eviction proceeds by provisionally selecting the second item of cached content 840 and comparing its probability value of 0.5 with the outcome value 830 of 0.6.

Here again, the probability value for the second item of cached content 840 is less than the outcome value 830 and the second item of cached content 840 is also retained in cache. Thereafter, the smart eviction provisionally selects the third item of cached content 850. In this case, the probability value of 0.8 for the third item of cached content 850 exceeds the outcome value 830 of 0.6. Consequently, the third item of cached content 850 is evicted from the cache such that the amount of storage consumed by the third item of cached content 850 is now available for use in caching other content.

Figure 9:
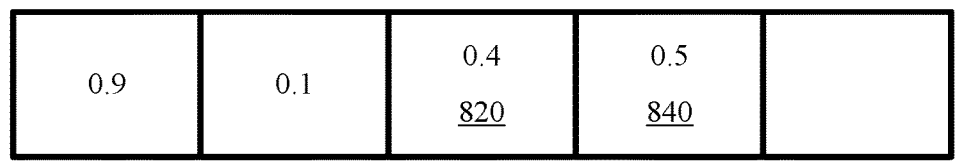
FIG. 9 illustrates the order with which the items of cached content from the cache will be provisionally selected in some embodiments after the smart eviction of FIG. 8 is complete.

FIG. 8 shows using the same outcome value in comparing against each of the items of cached content. In some embodiments, a different outcome value is generated for each comparison. Also in some embodiments, after each comparison, the order with which the cached content is provisionally selected changes. For instance, once an item of content is provisionally selected and retained in cache, it is moved to the back of a queue such that it will not be provisionally selected until all other items of cached content are provisionally selected at least once. For example, FIG. 9 illustrates the order with which the items of cached content from the cache 810 will be provisionally selected in some embodiments after the smart eviction of FIG. 8 is complete.

In some embodiments, the probability based smart eviction systems and methodologies are enhanced to operate in conjunction with other eviction methodologies such as the least recently used (LRU) methodology or the least frequently used (LFU) methodologies. These methodologies are used to determine the order for provisionally selecting the content to be analyzed as a candidate for eviction. Specifically, LRU can be used to provisionally select content based on its recency or based on the last time content was requested. In other words, the item of cached content that has not been requested for the longest amount of time is provisionally selected first when performing the probability based smart eviction. LFU can be used to provisionally selected content based on its frequency or how often content is requested. In other words, the item of cached content that is requested the least number of times is provisionally selected first when performing the probability based smart eviction. Other methodologies can also be used to provisionally select cached content as candidates for eviction.

IV. Probability Values

In some embodiments, the probability value associated with each item of content or content provider is manually set by a cache administrator. This allows the administrator to customize the cache allocation by prioritizing the cache for any desired content or content providers. For example, when a caching server is configured to cache content from first and second content providers, the caching server administrator can set a probability value of 0.9 for smart caching content of the first content provider and a probability value of 0.1 for smart caching content of the second content provider. In so doing, the administrator configures the caching server to prioritize caching of the first content provider content over the second content provider content. More specifically, for smart caching, 90% of requests for the first content provider content will result in the requested content being cached, whereas only 10% of requests for the second content provider content will result in the requested content being cached. Different probability values can be set for the smart eviction of the first content provider and second content provider content.

As an alternative to manually setting the probability values for either the smart caching or the smart eviction, some embodiments automatically derive the probability values based on any of several functions to which access to the cache storage is to be conditioned. Using the functions, the probability values are automatically computed for different content or content providers.

In some embodiments, the probability is a function of fairness. Fairness is intended to resolve the occurring phenomenon whereby a few content providers with large amounts of content dominate a server's cache footprint, thereby excluding other content providers from the benefits of having their content cached at the server. Fairness strives to balance the ratio of the percentage of the cache footprint consumed by a content provider to the percentage of bytes served for that content provider's content. This ensures that each content provider has a cache footprint relative to their bytes served.

Figure 10:
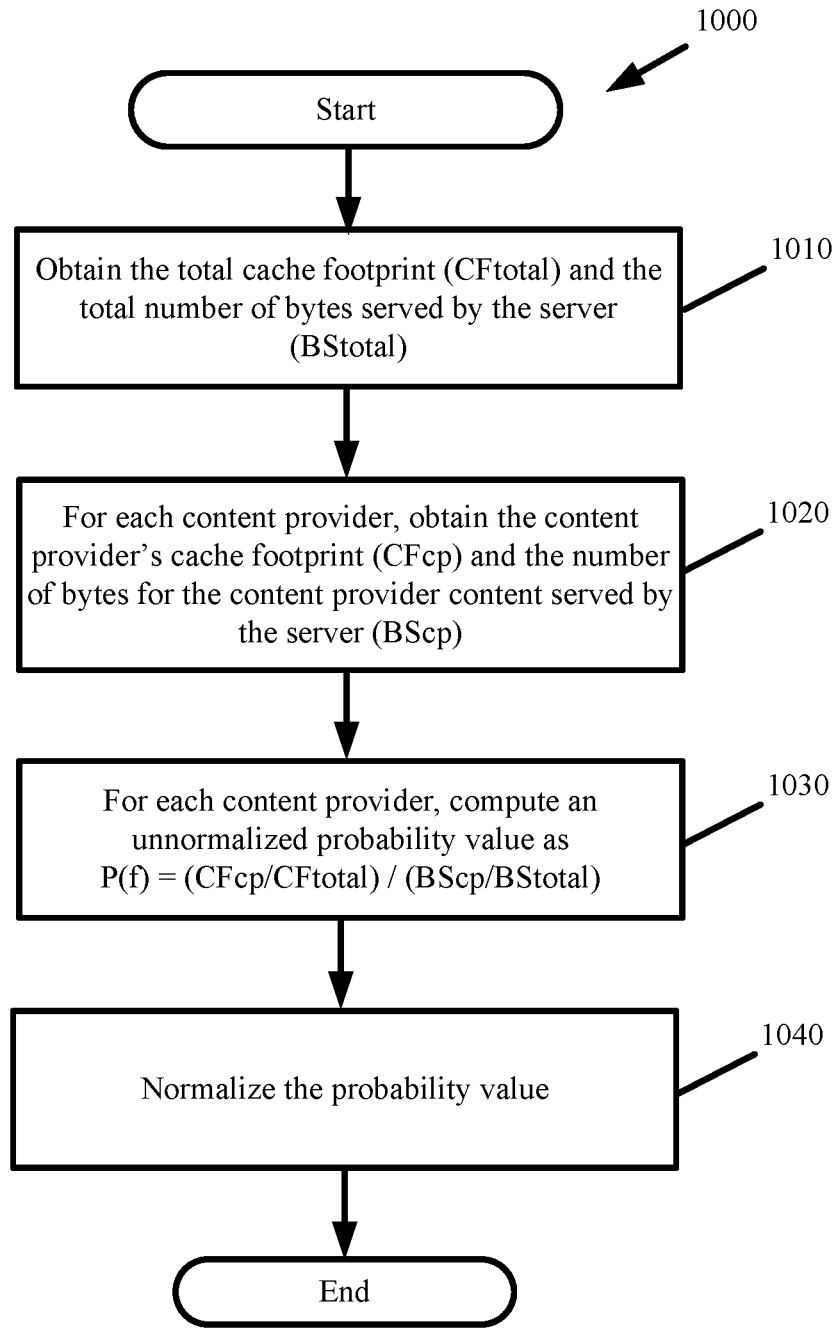
FIG. 10 presents a process for computing probability values as a function of fairness in accordance with some embodiments.

FIG. 10 presents a process 1000 for computing probability values as a function of fairness in accordance with some embodiments. Process 1000 can be performed by a caching server or an external server in charge of managing the cache of one or more caching servers.

The process obtains (at 1010) the total cache footprint (CFtotal) for the cache at issue and the total number of bytes for all content provider content served by the one or more servers providing the cache (BStotal). Stated differently, the CFtotal is the total size of the cache and the BStotal is the cumulative number of bytes served by the one or more servers.

For each content provider, the process obtains (at 1020) the content provider's cache footprint (CFcp) and the number of bytes for the content provider's content that is served by the one or more servers (BScp). The CFcp measures how much of the cache is used in caching the content provider's content and the BScp is typically an internal metric maintained by each of the servers involved as part of the cache.

For each content provider, an unnormalized probability value is computed (at 1030) by inputting the obtained values into a fairness probability function. In some embodiments, the fairness probability function is:

$$P(f) = (CFcp/CFtotal)/(BScp/BStotal) \tag{2}$$

The process then normalizes (at 1040) the resulting probability values for each content provider to a defined scale (i.e., 0-1). The normalized probability values can then be used for the smart caching and smart eviction systems and methods presented above. In some embodiments, the probability values are periodically recomputed as the parameters for the fairness function change over time.

Figure 11:
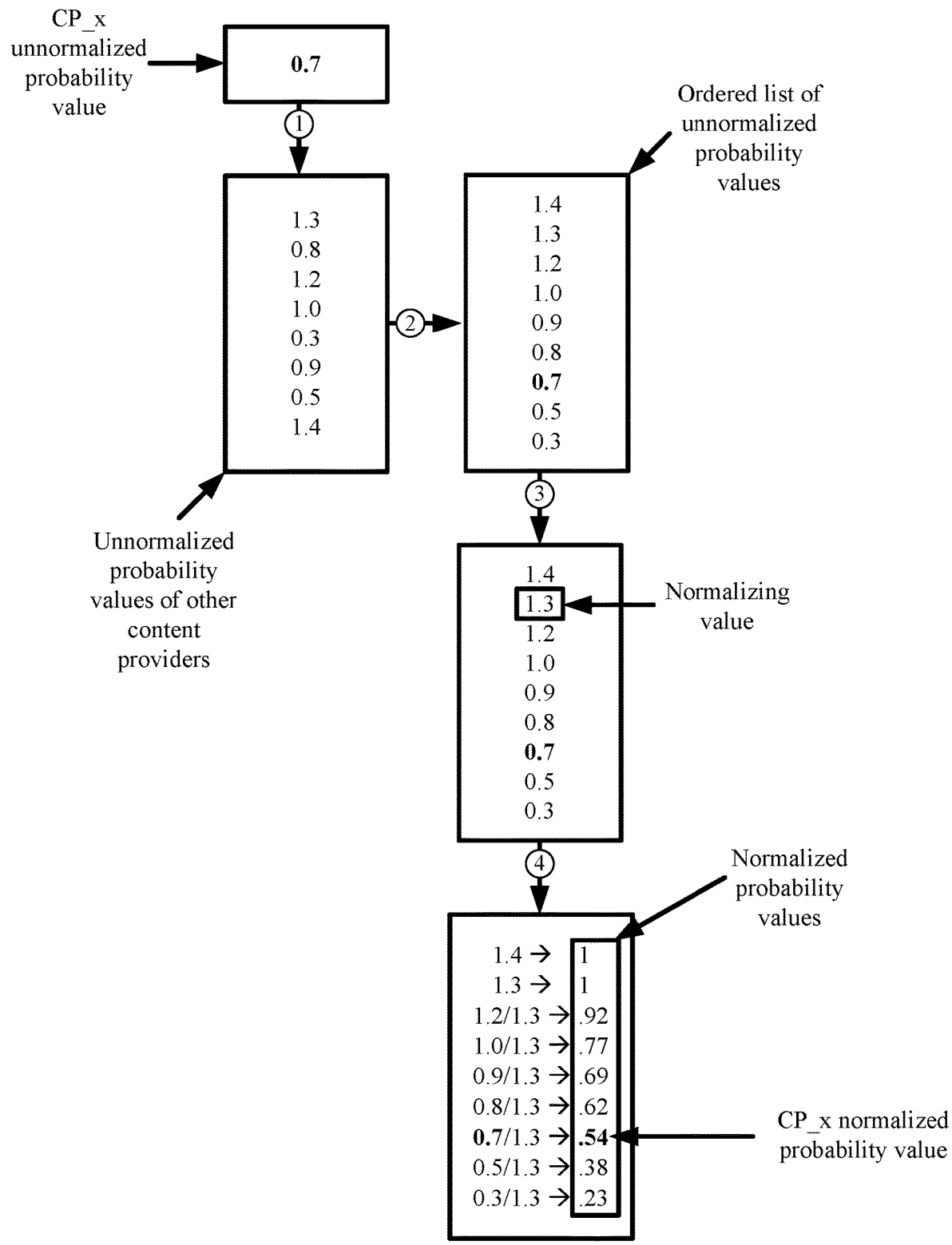
FIG. 11 conceptually illustrates normalizing probability values in accordance with some embodiments.

FIG. 11 conceptually illustrates normalizing probability values in accordance with some embodiments. Normalization involves entering the unnormalized probability value that is computed for a particular content provider to a list that stores the unnormalized probability values that are computed for other content providers. The list is then ordered according to the values. An unnormalized probability value at some percentile within the list is selected as a normalizing value. In this example, the unnormalized probability value at the $95^{th}$ percentile is selected. All unnormalized probability values in the list are then scaled relative to the normalizing value. In some embodiments, any unnormalized probability value greater than the normalizing value is scaled to a probability value of one. All other unnormalized probability values are divided by the normalized value to scale the values between 1 and 0. The resulting normalized probability values are then used to determine when to store content to cache as part of the smart caching of some embodiments and are used to determine when to evict content from cache as part of the smart eviction of some embodiments. For example, a normalized probability value of 0.9 indicates that provisionally selected content has a 90% likelihood of being evicted from cache storage.

The normalized probability values for the content providers are placed in server memory or storage to allow for efficient lookup when performing smart caching and smart eviction. In some embodiments, process 1000 is run at regular intervals or whenever a cache reallocation is desired in order to update the probability values. In some embodiments, process 1000 is run to compute the probability values prior to performing the smart eviction.

In some embodiments, the probability is a function of cost. In some such embodiments, access to the cache storage is prioritized based on how much cache access each content provider pays for. For smart caching, content providers that pay for greater access will be configured with a probability that increases the likelihood that their content is cached relative to other content providers that do not pay for the greater access. For smart eviction, content providers that pay for greater access will be configured with a probability that decreases the likelihood that their content is removed from cache when provisionally selected.

Figure 12:
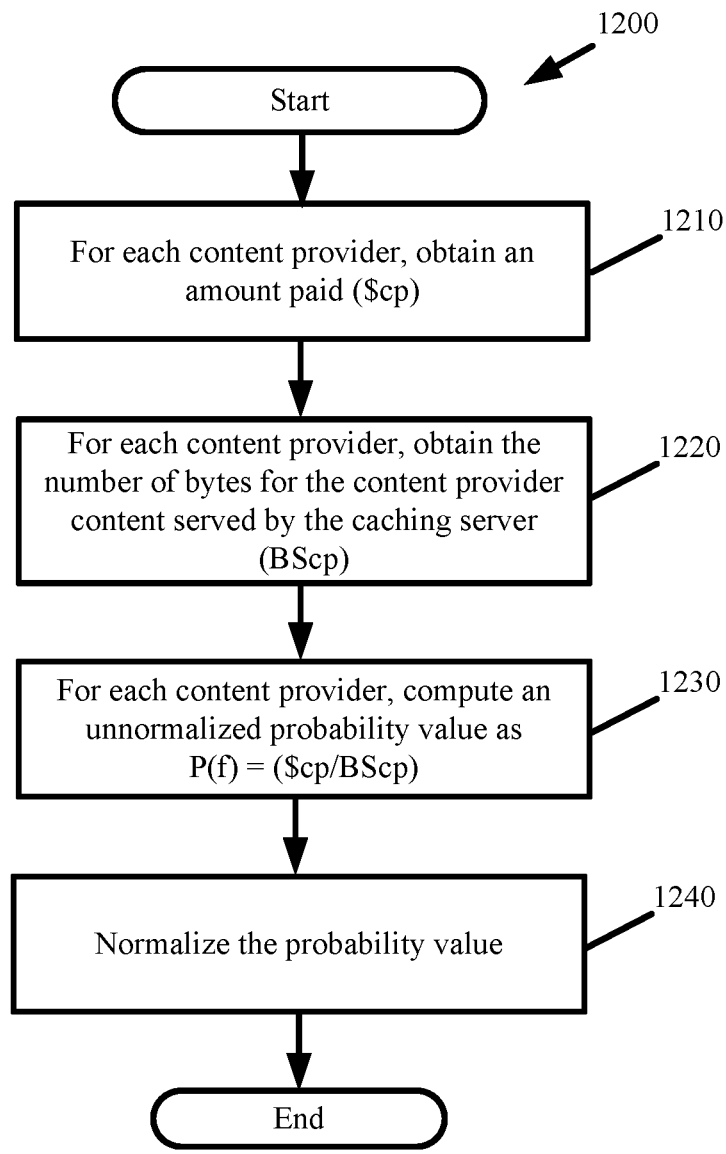
FIG. 12 presents a process for computing probability values as a function of cost in accordance with some embodiments.

FIG. 12 presents a process 1200 for computing probability values as a function of cost in accordance with some embodiments. Process 1200 can be performed by a caching server or an external server in charge of managing the cache of one or more caching servers.

For each content provider, the process obtains (at 1210) an amount paid ($cp). In some embodiments, content providers pay a flat fee for access to the caching server cache or different fees according to a contracted for amount of access. For example, a large content provider can be assessed a first fee that is greater than a second fee assessed to a small content provider. The process then obtains (at 1220) from the number of bytes for the content provider content that is served by the caching server (BScp).

For each content provider, an unnormalized probability value is computed (at 1230) by inputting the obtained values into a cost probability function. In some embodiments, the cost probability function is:

$$P(f)=(\$cp/BScp) \quad (3)$$

The process then normalizes (at 1240) the resulting probability values for each content provider to a scale of 0-1. The normalization can be similar to that described above with reference to FIG. 11. The normalized cost value can then be used for smart caching by caching content when the normalized cost value is greater than or equal to a generated random value. The normalized cost value can also be used for smart eviction by evicting content when the normalized cost value is greater than or equal to a generated random value.

Another manner to derive the probability value based on cost is to assign a probability value to each of several cost tiers and classify the content providers to the cost tiers according to how much they pay. For example, the caching server may provide a first level of cache access for a premium first fee, a second lesser level of cache access for a normal second fee, and a third lesser level of cache access for free. Thus, content providers paying the premium first fee are provided a probability value that increases the likelihood their content will be cached and will be retained in cache, while content providers that do not pay a fee are provided a probability value that decreases the likelihood their content will be cached and will be retained in cache.

In some embodiments, the probability is a function of content size. Content size refers to the number of bytes that are needed to transfer a specific item of content from one source (i.e., caching server) to one destination (i.e., a user). Small content includes text and low resolution images. Large content includes media such as video and audio content as well as applications. The content size probability function can be configured to prioritize the caching of small content relative to large content. This caching behavior may be desired in order to maximize the amount of cacheable content. Conversely, the content size probability function can be configured to prioritize the caching of large content relative to small content. This caching behavior may be desired when the performance penalty associated with a cache miss of large content is greater than the performance penalty associated with a cache miss of small content.

In some embodiments, the content size probability function produces a different probability value for each item of content. Although, the function can be configured to produce a different probability value for each content provider based on the average size of content for that content provider. When the content size probability function prioritizes small content, the function produces a higher probability value to increase the likelihood that small content will be cached and retained in cache relative to large content. For example, first content with a size of 10 kilobytes may be provided a probability value of 0.9 for caching, second content with a size of one megabyte may be provided a probability value of 0.6 for caching, and third content with a size of 1 gigabyte may be provided a probability value of 0.2 for caching, thus giving the third content the lowest likelihood of being cached on an individual request basis.

In some embodiments, implementing the content size based probability function involves tracking the size of content that is either cached or could be cached by the server. Tables or hashes can be used to efficiently track the content sizes. The content sizes may be tracked according to ranges. For instance, the server tracks the number of content that is 1 kilobyte to 1 megabyte in size and the number of content that is 1 megabyte to 100 megabytes in size. Then for a new item of content, the size of that new content is ordered in a list of tracked content sizes and the list is normalized to produce the probability value for that new item of content.

In some scenarios, cache is consumed by content that is only partially served. This can be detrimental to cache performance because the entirety of the content is in cache even though it is partially served, thereby reducing the amount of total content that can be cached. This occurs for certain type of content such as media content, whereas other content such as images, text, and applications are almost always entirely served. Accordingly, in some embodiments, the probability is a function of content type. In some such embodiments, a particular type of content that is often partially served is provided a lower probability to decrease its likelihood of being cached relative to other types of content that are often entirely served. Similarly, for smart eviction, the caching server is configured such that the particular type of content that is often partially served has a greater probability of being evicted from cache than other types of content that are often entirely served. In some embodiments, the function is configured to provide the inverse behavior. This may be desired when the cache penalty associated with the partially served content is greater than that of the fully served content or when the cache is prioritized for certain types of content. For example, a cache that is part of a video streaming platform will want to prioritize the cache for video content. Accordingly, a content type based probability function of some embodiments assigns a higher probability value to video content than for other types of content, thereby increasing the likelihood that the video content is cached and retained in cache relative to other types of content.

V. Server System

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 13:
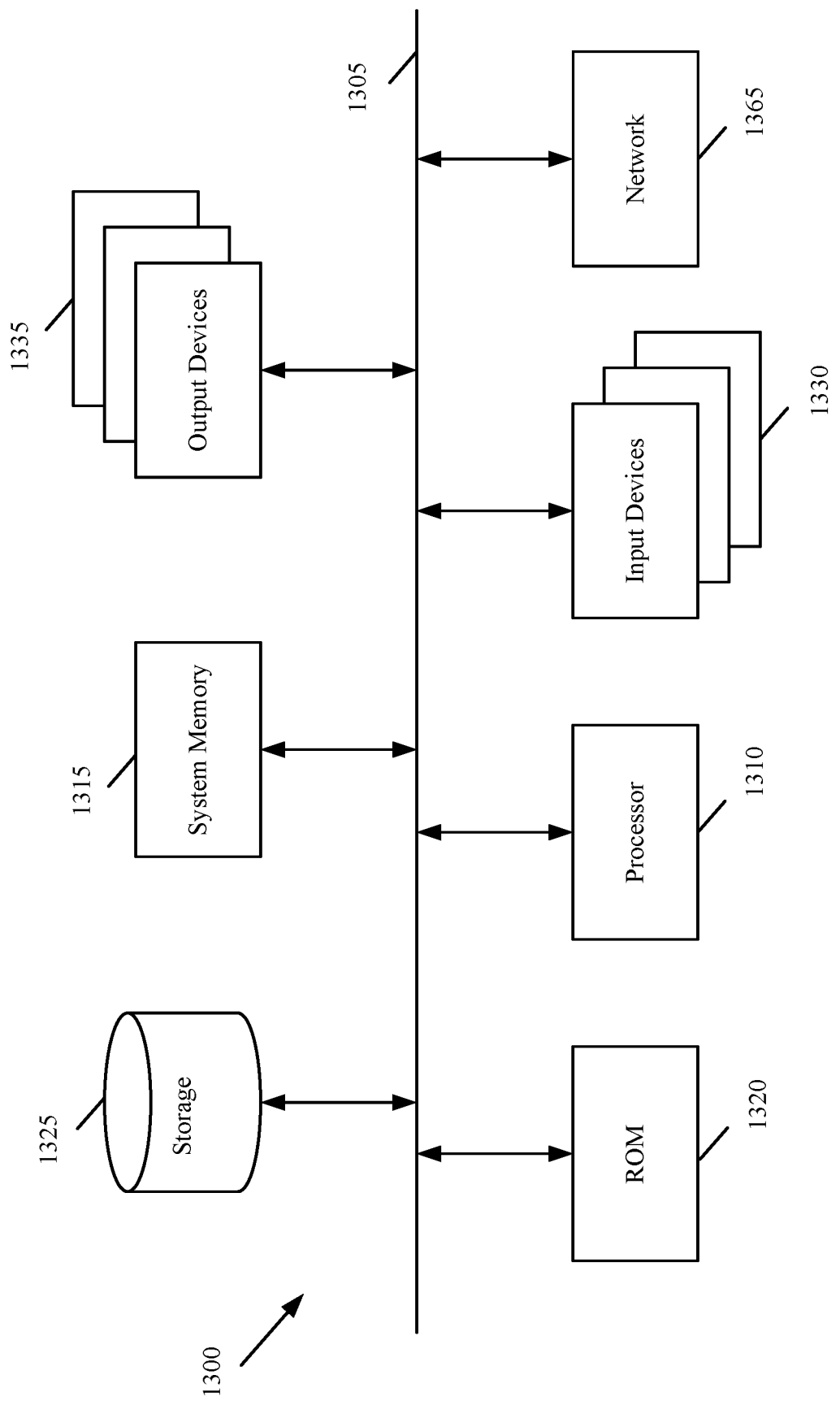
FIG. 13 illustrates a computer system or server with which some embodiments are implemented.

FIG. 13 illustrates a computer system or server with which some embodiments are implemented. Such a computer system includes various types of computer-readable mediums and interfaces for various other types of computer-readable mediums that implement the various methods and machines described above (e.g., caching servers). Computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325. From these various memory units, the processor 1310 retrieves instructions to execute and data to process in order to execute the processes of the invention. The processor 1310 is a processing device such as a central processing unit, integrated circuit, graphical processing unit, etc.

The read-only-memory (ROM) 1320 stores static data and instructions that are needed by the processor 1310 and other modules of the computer system. The permanent storage device 1325, on the other hand, is a read-and-write memory device. This device is a non-volatile memory unit that stores instructions and data even when the computer system 1300 is off. Some embodiments of the invention use a mass-storage device (such as a magnetic, solid-state disk, or optical disk and its corresponding disk drive) as the permanent storage device 1325.

Other embodiments use a removable storage device (such as a flash drive or solid-state disk) as the permanent storage device. Like the permanent storage device 1325, the system memory 1315 is a read-and-write memory device. However, unlike storage device 1325, the system memory is a volatile read-and-write memory, such as random access memory (RAM). The system memory stores some of the instructions and data that the processor needs at runtime. In some embodiments, the processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keypads (including physical keyboards and touchscreen keyboards), pointing devices (also called "cursor control devices"). The input devices 1330 also include audio input devices (e.g., microphones, MIDI musical instruments, etc.). The output devices 1335 display images generated by the computer system. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1300 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:
    configuring a first probability value for first content or a first content provider that originates the first content, and a different second probability value for second content or a second content provider that originates the second content;
    receiving a request at a content caching server with a cache, wherein the request is for content that is not stored to the cache;
    retrieving the content from an external source;
    obtaining a probability value of the content or a content provider that originates the content, the probability value specifying a likelihood for entering the content to the cache wherein obtaining the probability value comprises:
        selecting the first probability value in response to the request comprising a Uniform Resource Locator ("URL") that identifies the first content or the first content provider;
        selecting the second probability value in response to the request comprising a URL that identifies the second content or the second content provider; and
    performing one of at least a first outcome or a second outcome based on the probability value, wherein performing the first outcome comprises serving the content in response to said request and entering the content to the cache, and wherein performing the second outcome comprises serving the content in response to said request without entering the content to the cache.

2. The method of claim 1 further comprising:
generating a random value in a range comprising the probability value;
selecting the first outcome to perform in response to the probability value being greater than the random value; and
selecting the second outcome to perform in response to the probability value being less than the random value.

3. The method of claim 1 further comprising:
adjusting the probability value based on an amount of the cache that is used to store content of the content provider relative to content of other content providers.

4. The method of claim 1 further comprising:
adjusting the probability value based on a number of bytes served by the content caching server in response to requests for content of the content provider relative to the number of bytes served by the content caching server in response to requests for content of other content providers.

5. The method of claim 1 further comprising:
adjusting the probability value by a first value based on size of the content being less than a threshold size; and
adjusting the probability value by a different second value based on the size of the content being greater than the threshold size.

6. The method of claim 1 further comprising:
adjusting cache priority of the content by increasing the probability value to a third probability value in response to the cache priority of the content being greater than cache priority of other content served by the content caching server, and by decreasing the probability value to a fourth probability value in response to the cache priority of the content being less than the cache priority of the other content served by the content caching server;
wherein the third probability value is greater than the fourth probability value.

7. The method of claim 1 further comprising:
adjusting the probability value by increasing the probability value to a third probability value in response to the content being of a first type of content with a higher likelihood of being cached, and by decreasing the probability value to a fourth probability value in response to the content being of a different second type of content with a lower likelihood of being cached;
wherein the third probability value is greater than the fourth probability value.

8. The method of claim 1 further comprising:
adjusting the probability value by increasing the probability value to a third probability value in response to a greater fee that is paid by the content provider to increase the likelihood of the content provider content being cached, and by decreasing the probability value to a fourth probability value in response to a lower fee that is paid by the content provider;
wherein the third probability value is greater than the fourth probability value.

9. A device comprising:
a cache;
a non-transitory computer-readable medium storing a set of processor-executable instructions; and
one or more processors configured to execute the set of processor-executable instructions, wherein executing the set of processor-executable instructions causes the one or more processors to:
configure a first probability value for first content or a first content provider that originates the first content, and a different second probability value for second content or a second content provider that originates the second content;
receive a request for content that is not stored to the cache;
retrieve the content from an external source;
obtain a probability value of the content or a content provider that originates the content, the probability value specifying a likelihood for entering the content to the cache, wherein the processor-executable instructions to obtain the probability value further include processor-executable instructions to:
select the first probability value in response to the request comprising a Uniform Resource Locator ("URL") that identifies the first content or the first content provider;
select the second probability value in response to the request comprising a URL that identifies the second content or the second content provider; and
perform one of at least a first outcome or a second outcome based on the probability value, wherein performing the first outcome comprises serving the content in response to said request and entering the content to the cache, and wherein performing the second outcome comprises serving the content in response to said request without entering the content to the cache.

10. The device of claim 9, wherein the processor-executable instructions further include processor-executable instructions to:
generate a random value in a range comprising the probability value;
select the first outcome to perform in response to the probability value being greater than the random value; and
select the second outcome to perform in response to the probability value being less than the random value.

11. The device of claim 9, wherein the processor-executable instructions further include processor-executable instructions to:
adjust the probability value based on an amount of the cache that is used to store content of the content provider relative to content of other content providers.

12. The device of claim 9, wherein the processor-executable instructions further include processor-executable instructions to:
adjust the probability value based on a number of bytes served by the content caching server in response to requests for content of the content provider relative to the number of bytes served by the content caching server in response to requests for content of other content providers.

13. A method comprising:
receiving a request at a content caching server with a cache, wherein the request is for content that is not stored to the cache;
retrieving the content from an external source;
obtaining a probability value of the content or a content provider that originates the content, the probability value specifying a likelihood for entering the content to the cache;

adjusting the probability value based on one of (i) an amount of the cache that is used to store content of the content provider relative to content of other content providers, or (ii) a number of bytes served by the content caching server in response to requests for content of the content provider relative to the number of bytes served by the content caching server in response to requests for content of other content providers; and performing one of at least a first outcome or a second outcome based on the probability value resulting from said adjusting, wherein performing the first outcome comprises serving the content in response to said request and entering the content to the cache, and wherein performing the second outcome comprises serving the content in response to said request without entering the content to the cache.

14. A method comprising:

receiving a request at a content caching server with a cache, wherein the request is for content that is not stored to the cache;

retrieving the content from an external source;

obtaining a probability value of the content or a content provider that originates the content, the probability value specifying a likelihood for entering the content to the cache; and adjusting the probability value based on cache priority or fee payment, wherein adjusting the probability value based on the cache priority comprises increasing the probability value from a first value to a second value in response to cache priority of the content being greater than cache priority of other content served by the content caching server, and decreasing the probability value from the first value to a third value in response to the cache priority of the content being less than the cache priority of the other content served by the content caching server, and wherein adjusting the probability value based on the fees comprises increasing the probability value from the first value to the second value in response to a greater fee that is paid by the content provider to increase the likelihood of the content provider content being cached, and decreasing the probability value from the first value to the third value in response to a lower fee that is paid by the content provider; and performing one of at least a first outcome or a second outcome based on the probability value resulting from said adjusting, wherein performing the first outcome comprises serving the content in response to said request and entering the content to the cache, and wherein performing the second outcome comprises serving the content in response to said request without entering the content to the cache.

* * * * *